March 7, 1967
L. B. CASTIGLIA ET AL
3,307,263
TOE-IN GAUGE
Original Filed Feb. 16, 1961
3 Sheets-Sheet 1
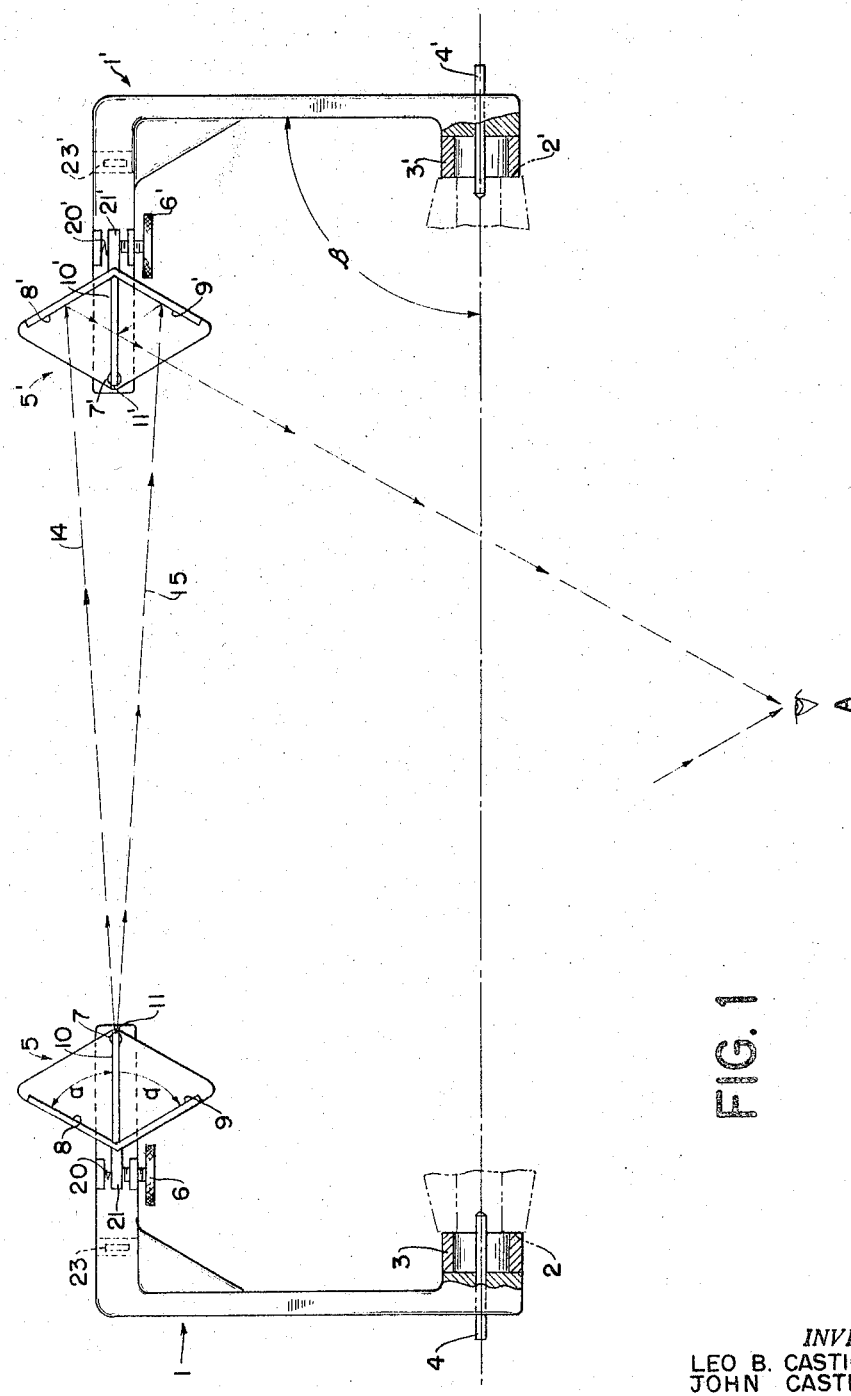
INVENTORS
LEO B. CASTIGLIA
JOHN CASTIGLIA
BY THOMAS CASTIGLIA
ATTORNEYS March 7, 1967  L. B. CASTIGLIA ET AL  3,307,263
TOE-IN GAUGE
Original Filed Feb. 16, 1961  3 Sheets-Sheet 2
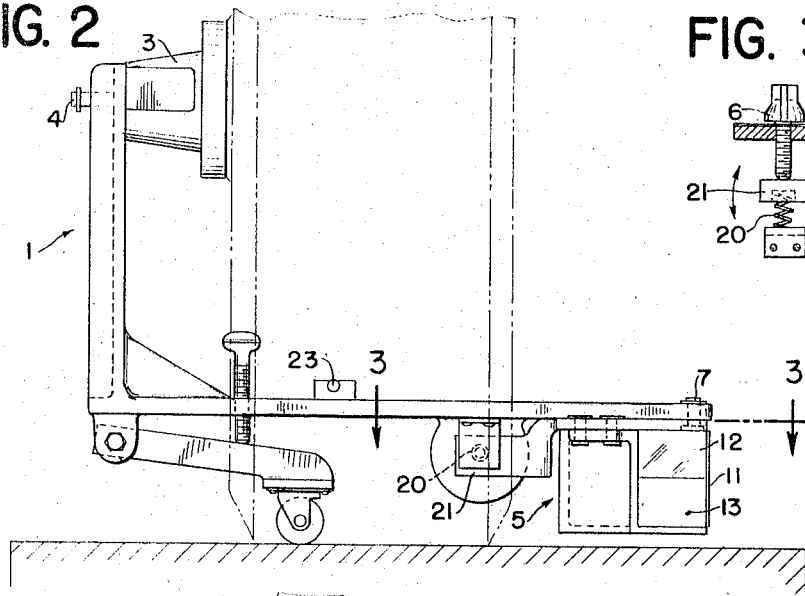
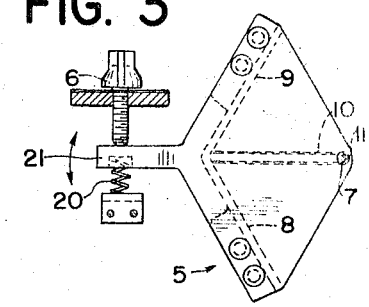
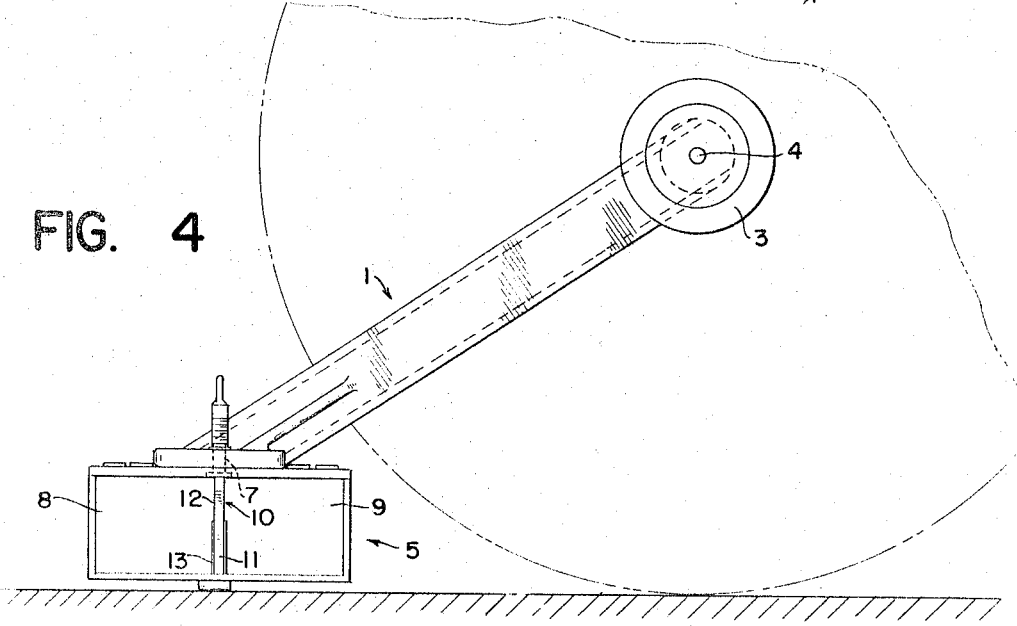
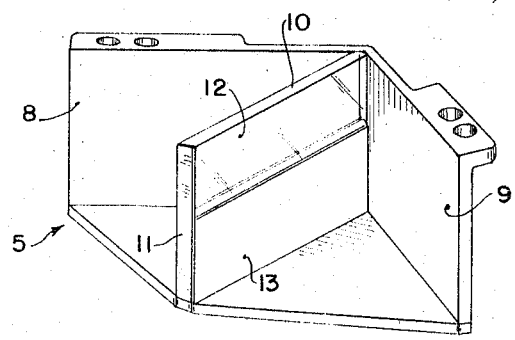
INVENTORS
LEO B. CASTIGLIA
JOHN CASTIGLIA
THOMAS CASTIGLIA
BY Pennie, Edmonds, Morton, Barrows and Taylor
ATTORNEYS March 7, 1967  L. B. CASTIGLIA ET AL  3,307,263
TOE-IN GAUGE Original Filed Feb. 16, 1961  3 Sheets-Sheet 3

INVENTORS
LEO B. CASTIGLIA
JOHN CASTIGLIA
THOMAS CASTIGLIA
BY
*Pennie, Edmonds, Morton, Barrows and Taylor*
ATTORNEYS

United States Patent Office 3,307,263
Patented Mar. 7, 1967

3,307,263
TOE-IN GAUGE
Leo B. Castiglia and John Castiglia, Plainview, and Thomas Castiglia, Hicksville, N.Y., assignors to Wheel Aligning Necessities, Inc., a corporation of New York
Continuation of application Ser. No. 89,843, Feb. 16, 1961. This application June 25, 1964, Ser. No. 379,440
15 Claims. (Cl. 33—46)

This invention relates to a wheel gauge and more particularly to a gauge which will measure and aid in the adjustment of the toe-in of the steerable wheels of a wheeled vehicle having an undamaged frame by reference to a fixed reference plane. This application is a continuation of our copending application Serial No. 89,843 filed February 16, 1961.

Toe-in is the amount which the front wheels converge toward each other at their front, or more accurately stated, toe-in is the amount each wheel deviates from the straight ahead portion with ideal toe-in being that where the wheels converge towards the front in an exact equal amount from the longitudinal axis of the vehicle. Toe-in is a major consideration in steering wheel geometry as it effects tire wear and the steering characteristics of a vehicle.

Heretofore toe-in has been measured by turntables, protractors, gauges and the like. These devices have had the disadvantages of being either too complicated for use by the average garageman or too cumbersome or too delicate for continued satisfactory use. Many of the devices do not measure toe-in with respect to the theoretical longitudinal axis of the vehicle. Others are dependent for their measurements upon reference points external to the vehicle. Generally, too, the present devices require separate steps in checking the measurement and making the necessary adjustment upon the vehicle thus unnecessarily lengthening the adjustment operation.

Our invention is of simple construction and rugged design and can be easily operated by any person familiar with automobile mechanics. It is exceptionally accurate. The toe-in error is presented in a visual fashion such that the mechanic can see how much correction is necessary for each wheel while he is under the vehicle making the adjustments on the tie rods by which toe-in is regulated.

Broadly, we propose a device comprising a pair of matched rigid members, one end of each rigid member having a securing means to secure to it the hub face of each front wheel or to the spindle, bearing, or any face parallel to the true wheel plane. At the other end of each matched rigid member is an optical unit in which is presented a split image of a reference marker located upon the other rigid member. The hub face of each wheel is normally a machined surface and is an accurate reference plane to which our invention is secured. It is a characteristic of automobiles that the end faces of the wheel hubs are normally machined when the wheel is made in order to insure proper location of the spindle axis. Further, the gauge may be attached to an adaptor which in turn is positioned at right angles to and centered with respect to the spindle axis. When the steering wheel of the automobile having an undamaged frame is centered and positioned for straight ahead driving and the steering sector is on its high point, our novel gauge may be used to measure the angle of the wheels to which it is attached with reference to the theoretical longitudinal axis of the automobile and thus a true axis from which to measure toe-in is offered independent of mechanical linkages or reference points separate from the vehicle.

This gauge may also be used to measure the toe of the rear wheels of a vehicle, as for example in vehicles having independent rear wheel suspension. It may also be used to check the tracking of all four wheels.

At the other end of each matched rigid member is an optical unit in which is presented an image of a reference marker located upon the other rigid member. Each optical unit broadly comprises two vertically positioned mirrors, a split image mirror, and a reference marker or target. By reason of the matched construction of the rigid arm members, the optical units and reference markers are each located the same distance from their respective hub centers when the devices are attached to the steerable wheels.

When each rigid member is properly positioned, the mechanic working under the automobile sees from a distance and presented at the split image mirror of one optical unit a two-part image of the reference marker of the opposite unit. Since the angle of the optical units is pre-set for the required degree of toe-in, it geometrically follows that the alignment of the split images can be effected only by adjusting the toe-in of the wheels to the correct amount. It further follows that when the split images are aligned in both optical units that the degree of toe-in for both wheels is the same with respect to the spindle axis or the longitudinal axis of the automobile where the automobile has an undamaged frame. It is understood that a similar split image presentation can be achieved by other optical means such as by lenses and prisms.

Referring to the drawings which more clearly illustrate our invention:

FIG. 1 is a bottom view of our invention in working position secured to the machined end faces of the hubs of the steerable front wheels of a vehicle;

FIG. 2 is a front elevation of one member of our invention as applied to a wheel partially shown;

FIG. 3 is a sectional view of one optical unit taken along line 3—3 of FIG. 2;

FIG. 4 is a side elevation of the unit shown in FIG. 2;

FIG. 5 is an enlarged isometric view of the optical unit illustrating the mirror arrangement;

Figure 6:
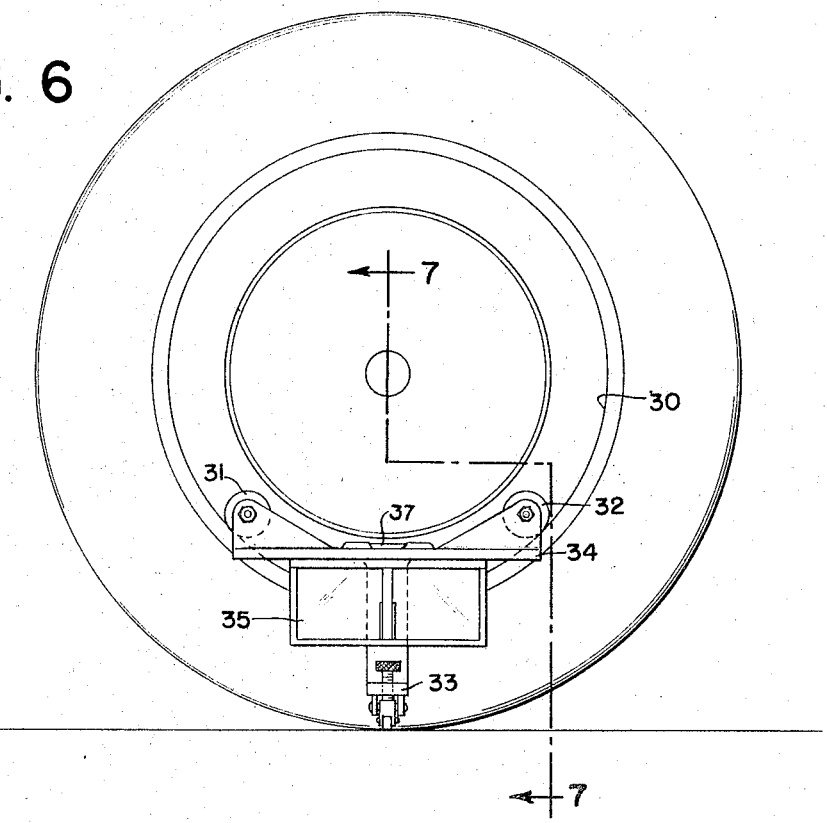
FIG. 6 is a side elevation of another embodiment of our invention showing its application to a wheel rim; and, FIG. 7 is a sectional view taken along line 7—7 of FIG. 6.

Referring to the drawings in greater detail, FIG. 1 illustrates a rigid arm member denoted generally by 1 secured to the machined end face 2 of the wheel hub of the right steerable wheel of a wheeled vehicle, while 1' illustrates a similar member applied to the left steerable wheel. It must be remembered that FIG. 1 represents a bottom view looking up at the front steerable wheels of a vehicle so that the left front wheel appears on the right side of the drawing. The member 1 is secured to the hub by means of a magnet 3 and centered upon the hub face by a centering pin 4 which protrudes into the machined spindle center hole or drill point. Member 1 could also be secured by means of a clamp, bolt, cotter pin, or similar means. Centering could also be achieved by a cotter pin arrangement. Located at the other end of rigid member 1, which in this embodiment is an "L" shaped or right angle casting, is a movable optical unit 5 and a calibrated set screw 6. This movable optical unit 5 pivots on a vertical axis about point 7, the amount of deviation from normal being established by a control means comprising the set screw 6 and a spring 20 which urges the lug 21 attached to the optical unit into contact with the set screw 6. The movable optical unit comprises mirrors 8 and 9 and a split image mirror 10. Split image mirror 10 is located along a line bisecting the angle between mirrors 8 and 9. A vertical reference marker 11 is affixed along this same bisecting line at point 7.

A better understanding of the optical unit 5 is gained by reference to FIG. 5 where the mirrors 8 and 9, split image mirror 10 and reference marker 11 are more clearly shown. Split image mirror 10 has a clear upper half 12 and a mirrored lower half 13 or may simply be a mirror approximately one half the height of mirrors 8 and 9.

Referring again to FIG. 1, arrows 14 and 15 represent rays originating from reference marker 11 located upon member 1. Ray 14 is reflected by mirror 8' through the clear half 12' of split image mirror 10' to the observer at point A. Thus the observer at A can see only the upper half of reference marker 11 reflected in mirror 8'. Ray 15 is reflected by mirror 9' upon the mirrored lower half 13' of split image mirror 10' and thence reflected to the observer at A. Thus the observer at A sees the lower part of reference marker 11 reflected upon the mirrored surface 13 of split image mirror 10'. The two images so presented to the viewer at A meet only when the reference marker or target 11 of the optical unit 5 is continued within a plane extending normal to the longitudinal axis of the vehicle and is parallel to the spindle axes of the wheels when the steering wheel of the vehicle is centered. The overall effect is to create an optical square. The position of the optical unit 5 and therefore the split image mirror 10 is affected by two factors:

(a) the turning of the calibrated set screw 6 and
(b) the movement of rigid member 1 either in a vertical or horizontal plane.

If the calibrated set screw 6 is turned and pre-set to represent a certain amount of toe-in, and the optical units are in a horizontal plane established by levels 23 and 23', or other leveling means, it follows that the only way the split image can be aligned is by adjusting the toe-in of the wheel, thereby moving the attached rigid member 1'. It follows that when set screws 6 and 6' are both set to the same degree and the split images are aligned in both units 5 and 5', that the degree of toe-in will be the same for both wheels. Since both rigid members 1 and 1' are secured to hub faces 2 and 2', which hub faces are machined surfaces, adjustments by means of this invention will result in the same degree of toe-in with reference to the longitudinal axis.

Using the gauge that we propose, any mechanic familiar with automobiles can adjust toe-in of a vehicle quickly, accurately, and conveniently. The process is simple. The vehicle is driven into the garage and left standing on the floor or put upon a conventional rack. The steering wheel of the vehicle is then centered. A rigid member of our invention is attached by means of the magnet to the machined end face of each wheel and centered thereon by means of a centering pin which fits into the machined spindle center hole. The optical units on each member are brought into a horizontal plane by means of the level located upon each member. The adjustable support arm is then set to insure that the units are held stable with respect to the horizontal plane.

The mechanic then "dials in" the amount of desired toe-in by turning the set screw which positions the optical units. From a suitable position, usually beneath the vehicle, and while working on the tie-rods which adjust toe-in, the mechanic can view the split image of one reference marker in the opposite optical unit. By manipulating the tie-rod, which adjusts toe-in, of the wheel on the same side as the optical unit at which he is looking, he can bring the split image in line. The operation is then repeated on the other side. When the split images of each reference marker or target are aligned in each optical unit, the toe-in is correct for both wheels.

This device is exceptionally accurate. Because of the relatively long distance between optical units and because a split-image principle is used, a very slight deviation in alignment of the targets is multiplied and immediately noticeable. The device is convenient because it allows the mechanic to make his adjustments and his readings at the same time from beneath the vehicle where the adjusting means is located and without the need for a toe-bar or cumbersome linkages to hamper his movements. It allows the job of adjusting toe-in to be done more quickly because it saves steps in adjustment and reading since both viewers may be seen without undue change of position on the part of the mechanic.

Figure 7:
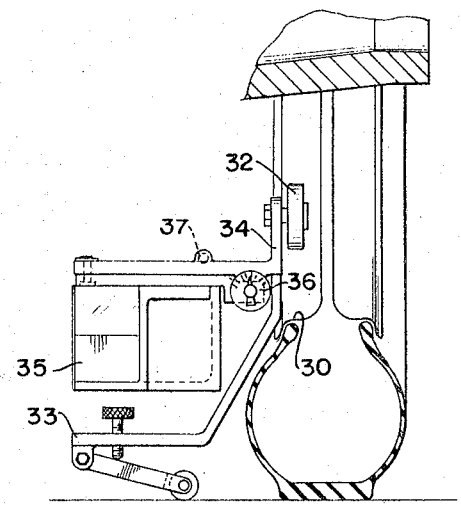

Another embodiment of our invention is shown in FIGS. 6 and 7. The principle of operation is the same as heretofore discussed. However, in this embodiment the device is positioned upon the wheel rim 30 by means of rollers 31 and 32 and an adjustable support arm 33 all attached to a rigid member 34. The optical unit 35, set screw 36, and level 37 are similar in all respects to the optical unit, set screw and level already described.

In this particular embodiment, the separate matching members of our gauge are placed upon the inner rims of the steerable wheels after the steering wheel has been centered. The rollers act as a support on one side of the matching member and allow the unit to be adjusted and leveled. The adjustable support arm acts to steady the gauge when in use. Once the level position of the units has been set, the mechanic dials in the desired amount of toe-in by turning the calibrated set screws. From a position beneath the vehicle, the mechanic can adjust the tie-rods and view the split images of the reference markers as presented in the optical units. As the tie-rod is adjusted, the angle of toe-in is changed, the optical unit and member positioned on that side are moved, and the split image presentation of the opposite reference marker is thereby changed. To bring the split images into alignment, the toe-in of the wheels must be the same amount as that represented by the pre-set position of the set screws.

We claim:

1. A device for adjusting wheel toe-in of a vehicle comprising two separate matching members, a positioning means for positioning said matching members with respect to the wheel spindle and parallel to the wheel plane of said vehicle, an adjustable support arm secured to each said matching member, a leveling means attached to each said matching member, and an optical alignment unit secured to each said matching member, each said optical alignment unit in turn comprising a reference marker, a split image reflecting means for presenting a split image of the other said reference marker, and a control means for controlling the position of each optical unit with respect to the longitudinal axis of the vehicle; whereby the correct toe-in of the said wheels is accomplished when the split image of each said reference marker in the opposite optical alignment unit is brought into alignment by adjustment of said wheels.

2. A device for adjusting wheel toe-in of a vehicle comprising two separate matching members, a means for securing and centering said matching members to the wheels of said vehicle, and an optical alignment unit secured to each said matching member, said optical alignment unit comprising a movable mirror box, each said mirror box in turn comprising two mirrors, a split-image mirror, and a reference marker, said movable mirror boxes, said mirrors, said split-image mirrors, and said reference markers being positioned such that an image of one said reference marker located upon one said matching member may be cast upon said split-image mirror located within the other said miror box when said matching members are secured to said wheels.

3. A device for measuring wheel toe-in of a vehicle having a steering wheel and steerable wheels comprising two separate matching rigid members, a securing means for securing one end of each said rigid member to a steerable wheel of said vehicle, a centering means for centering each said rigid member with respect to the steerable wheel to which it is attached, a movable optical alignment unit located at the other end of each said rigid member, a control means for controlling the position of each said movable optical unit with respect to the longitudinal axis of the vehicle when the steering wheel is centered, and a reference marker associated with each said movable optical unit to indicate the position of the other said optical unit with said longitudinal axis.

4. A device according to claim 3 wherein the means for controlling the position of each said movable optical unit is a calibrated set-screw for rotating said mirror about a vertical axis contained in the plane of said split-image mirror, the calibrations thereon representing varying positions of toe-in.

5. A device according to claim 3 wherein each said reference marker will be in a plane normal to said longitudinal axis and parallel to the spindle axis of said steerable wheels when said steering wheel is centered and when the toe-in of each said steerable wheel is equal.

6. A device according to claim 3 having in addition an adjustable support arm on each said rigid member for regulating the height of said arm and a level affixed to each said rigid member to insure that each said optical unit is in the same horizontal plane.

7. A device for measuring wheel toe-in of a vehicle having a steering wheel and two steerable front wheels comprising a right-hand right angle member and a left-hand right angle member, a securing means located on one end of each said member for securing a leg of each said member to the machined end face of the hub of each said front steerable wheel, a movable optical unit located on the other leg of each said member, each said optical unit comprising in turn two mirrors at an angle to each other bisected by a split-image mirror and a target, and control means for moving each said optical unit about a vertical axis; said target associated with one said optical unit presenting a split-image in the mirror of the other said optical unit when it is not contained within a reference plane extending normal to the longitudinal axis of said vehicle and presenting a single image when it is within said reference plane.

8. A device for adjusting wheel toe-in of a vehicle comprising two separate matching members, a means for positioning said matching members upon the wheel rims of said vehicle, an adjustable support arm secured to each said matching member, a level attached to each said matching member and an optical alignment unit in turn comprising a movable mirror box, two mirrors, a split-image mirror, a reference marker, and a control means for controlling the position of each optical unit with respect to the longitudinal axis of the vehicle.

9. A device for measuring wheel toe-in of a vehicle having a steering wheel and steerable wheels comprising two separate matching rigid members, a securing means for securing one end of each said rigid member to a steerable wheel of said vehicle, a centering means for centering each said rigid member with respect to the steerable wheel to which it is attached, a movable optical alignment unit having two mirrors and a split-image mirror located at the other end of each said rigid member, a control means for controlling the position of each said movable optical unit with respect to the longitudinal axis of the vehicle when the steering wheel is centered, and a reference marker associated with each said movable optical unit to indicated the position of the other said optical unit with said longitudinal axis; said two mirrors of said optical unit being positioned at such angle with respect to each other as to both reflect light from a given source upon said split-image mirror, and said split-image mirror being positioned longitudinally along a line bisecting the angle between the said two mirrors.

10. A device for measuring wheel toe-in of opposed wheels of a vehicle comprising a right-hand right angle member and a left-hand right angle member, a securing means located on one end of each said member for securing a leg of each said member to the machined end face of the hub of each said front steerable wheel, a movable optical unit located on the other leg of each said member, each said optical unit comprising in turn two mirrors at an angle to each other bisected by a split-image mirror and a target, and control means for moving each said optical unit about a vertical axis; said target associated with one said optical unit presenting a split image in the mirror of the other said optical unit when it is not contained within a reference plane extending normal to the longitudinal axis of said vehicle and presenting a single image when it is within said reference plane.

11. A device for measuring, comparing, and setting toe-in on opposed wheels of a vehicle with respect to a reference plane extending normal to the spindle axis about which said wheels rotate, comprising two separate rigid members, securing means for securing and centering one end of each said member parallel to the plane of rotation of one of said wheels, a movable optical split-image viewer located at the opposite end of each said member, a control and indicator means for controlling and indicating the position of each said viewer with respect to said reference plane, and a reference marker fixed to each said member about which each said viewer pivots; said securing means and the movable optical viewer of one said rigid member being pre-calibrated with respect to the securing means and viewer of the other said rigid member to form an optical square such that when members are secured to opposed wheels, deviations of said wheels from said optical square appears as split-reference marker images in said optical viewers whereby each optical viewer indicates the relation of the wheel to which it is attached to said optical square.

12. A device for measuring wheel toe-in of a pair of oppositely disposed wheels of a vehicle, comprising two rigid arm members wherein each said arm member has a securing means mounted on one end thereof for securing one end of the arm to one of said wheels, centering means for centering the secured end of said arm with respect to the wheel center, adjustable support means on the free end of said arm opposite said secured end for supporting said free end, optical projection means including a traget and an image receiving portion readible from beneath the vehical mounted on the free end of said arm and level means associated with the arm; the target of one said optical projection means projecting into the image receiving portion of the other said optical projection means to give a measurement of angular displacement of said arms with respect to each other when said arms are in a common plane passing through the centers of both the steerable wheels as indicated by a common reading of the levels asociated with both arms.

13. A device for measuring wheel toe-in of a pair of oppositely disposed wheels of a vehicle comprising two rigid arm members, each said arm member having one end adapted to be mounted on one of the wheels, means for centering the end of said arm member mounted on the wheel with respect to the wheel, adjustable support means on the free end of said arm member opposite from the mounted end for adjustable supporting the free end vertically with respect to the center of the wheel, optical line of sight means including a target and an image viewing portion movably mounted on the free end of said arm member and viewable from beneath the vehicle, and level means associated with the arm member for indicating when said arm members when mounted on both wheels are in a common plane passing through the center of the wheels; both said optical units forming an optical square with respect to a line connecting the centers of both wheels whereby toe-in of each said wheel may be measured with respect to said optical square.

14. A device for setting each wheel of a pair of oppositely disposed wheels of a vehicle to a predetermined amount of toe-in with respect to a line conecting the wheel centers; said device comprising a pair of rigid members each adapted to be secured at one end to the center of a wheel, level means associated with each rigid member, adjustable means associated with each rigid member for supporting the unsecured end thereof, an optical means on each said rigid member, each said optical means having an image viewing portion and target producing portion whereby the target producing portion of one said optical means may project a reference mark on the image viewing position of the other said optical means, and calibration means associated with each said optical means whereby each said optical means may be preset with respect to the line connecting the wheel centers in order that an observer may observe through the reference marks the angular position of the wheels with respect to the line connecting their centers.

15. A device according to claim 12 wherein each said image receiving portion is adjustable with respect to the arm member on which it is mounted whereby each image receiving portion may be moved to a position such that when the images of both targets of both optical means are aligned with the targets of both optical means, the wheels on which the arms are secured are positioned at a preselected toe-in.

References Cited by the Examiner

UNITED STATES PATENTS

| | | |
|---|---|---|
| 2,475,502 | 7/1949 | Holmes. |
| 2,575,194 | 11/1951 | Smith _____ 33—46.2 |
| 2,689,403 | 9/1954 | Wilkerson _____ 33—46.2 |
| 2,882,608 | 4/1959 | Tursman _____ 33—203.18 |
| 2,972,189 | 2/1961 | Holub _____ 33—46.2 |
| 2,988,952 | 6/1961 | Hopkins _____ 88—14 X |

FOREIGN PATENTS

| | | |
|---|---|---|
| 496,541 | 12/1938 | Great Britain. |
| 535,330 | 4/1941 | Great Britain. |

LEONARD FORMAN, *Primary Examiner.*

ISAAC LISANN, *Examiner.*

WILLIAM D. MARTIN, JR., *Assistant Examiner.*